US006312160B1

(12) United States Patent
Sugiyama

(10) Patent No.: US 6,312,160 B1
(45) Date of Patent: Nov. 6, 2001

(54) BEARING CONSTRUCTION FOR DRIVE SHAFT

(75) Inventor: Takafumi Sugiyama, Shizuoka-ken (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 09/401,903

(22) Filed: Sep. 23, 1999

(30) Foreign Application Priority Data

Sep. 30, 1998 (JP) .................................................. 10-292897

(51) Int. Cl.⁷ ....................................................... F16C 21/00
(52) U.S. Cl. ............................ 384/420; 384/126; 384/537
(58) Field of Search .................................... 384/126, 420, 384/228, 537, 425

(56) References Cited

U.S. PATENT DOCUMENTS 4,627,512    12/1986    Clohessy .

FOREIGN PATENT DOCUMENTS 61-238516    10/1986    (JP) .

Primary Examiner—Lenard A. Footland
(74) Attorney, Agent, or Firm—Flynn, Thiel, Boutell & Tanis, P.C.

(57) ABSTRACT

A bearing construction for a drive shaft in which a spindle is disposed internally of an axle bearing of a wheel. An outer joint of the drive shaft is disposed internally of the spindle, and drive force from an engine is transmitted to the wheel through the outer joint. A bearing diametrally supporting the outer joint is provided between the spindle and the outer joint, and a washer is axially press-fitted on the outer joint axially between the spindle and a part of the outer joint.

20 Claims, 5 Drawing Sheets

BEARING CONSTRUCTION FOR DRIVE SHAFT

FIELD OF THE INVENTION

This invention relates to a bearing construction of a drive shaft, and particularly to a bearing construction of a drive shaft which suppresses generation of noise by a bearing, prevents a washer from falling during assembling work, and eliminates a possibility that assembling is finished in the state that the washer is not mounted, to enable enhancement of accuracy and reliance of assembling work.

BACKGROUND OF THE INVENTION

In the bearing construction for a drive shaft, the bearing construction often employs an inner ring rotation system in terms of simplification of the layout. However, in a vehicle such as a part-time type 4-wheel drive vehicle, mounting of an autolocking hub is presupposed, and a bearing construction of-an outer ring rotation system is often employed in terms of restriction in construction of the autolocking hub.

In the outer ring rotation type bearing construction, as shown in FIG. 11, there is used an outer joint 102 of a drive shaft extending through a hollow sleeve or spindle 104. In the outer joint 102, one end (which is a wheel side end) is supported by being disposed on an autolock hub 132 (or equivalent article) which is fixed to a hub 134 supported on spindle 104 by an axle bearing 136, and the other end is supported on the spindle 104 through a bearing 106 such as a needle bearing. The aforementioned arrangement is one which is not an autolock hub used in a part-time type 4-wheel drive vehicle, but is employed for a full-time 4-wheel drive vehicle-which has a function to transmit rotation of the drive shaft to the hub.

The aforementioned bearing construction for a drive shaft is disclosed in Japanese Patent Application Laid-Open No. 61-238516. In the apparatus for controlling intermittence between the vehicle and a drive mechanism therefor as disclosed in the 61-238516 publication, there is provided a spindle provided with inner and outer rotation supporting surfaces, the spindle being mounted on a vehicle's frame, and an axle portion is supported on a rotational shaft on the inner supporting surface of the spindle through a bearing member.

In the conventional bearing construction of the drive shaft, as shown in FIG. 12, a sleeve bushing 232 with a sliding member 210 is press-fitted into a spindle 204, and an outer joint hub 202 of the drive shaft is inserted into the inner surface of the sliding member 210 of the bushing 232, whereby the outer joint 202 is rotatably slidably movably supported. Note that the sliding member 210 is formed of low friction resin impregnated metal. In this arrangement, the construction is simple, but noises are possibly generated depending upon the use conditions, posing an inconvenience and being disadvantageous in practical use.

Further, as shown in FIG. 13, a bearing 306 for diametrally (perpendicularly) supporting an outer joint hub 302 of the drive shaft is provided between spindle 304 and the outer joint hub 302, and a thrust washer 342 for axially supporting the outer joint hub 302 is provided between the hub 302 and the spindle 304. In this case, the bearing 306 is used for the diametral support which imposes a relatively large load. An inconvenience of generating noises as described above can be avoided, and the thrust washer 342 whose both sides are sliding surfaces is provided for the axial support, which is advantageous in that the sliding member need not be used. However, there is a possibility that in the assembling work, the thrust washer falls, and the assembling is finished in the state that the thrust washer is not mounted, posing an inconvenience that the accuracy and reliance of the assembling work are low.

SUMMARY OF THE INVENTION

For minimizing or eliminating the aforementioned inconveniences, the present invention provides a bearing construction for a drive shaft in which a spindle sleeve is disposed internally of an axle bearing of a wheel, an outer joint or hub of the drive shaft is disposed internally of the spindle, drive force from an engine is transmitted to the wheel through the outer joint, a bearing for diametrally supporting the outer joint is provided between the spindle and the outer joint, and a washer for axially supporting the outer joint is press-fitted on the outer joint.

As described above, according to the present invention, in the assembling work, the washer is press-fitted on the outer joint of the drive shaft, the spindle is disposed on the outer joint or hub 2 of the drive shaft through the bearing after the washer has been press-fitted, the outer joint is diametrally supported by the bearing, the washer is positively prevented from falling during the assembling work. A possibility that the assembling is finished in the state that the washer is not mounted is eliminated, and the accuracy and reliance of the assembling work are enhanced.

DETAILED DESCRIPTION

The embodiments of this invention will be described in detail hereinafter with reference to the drawings.

Figure 1:
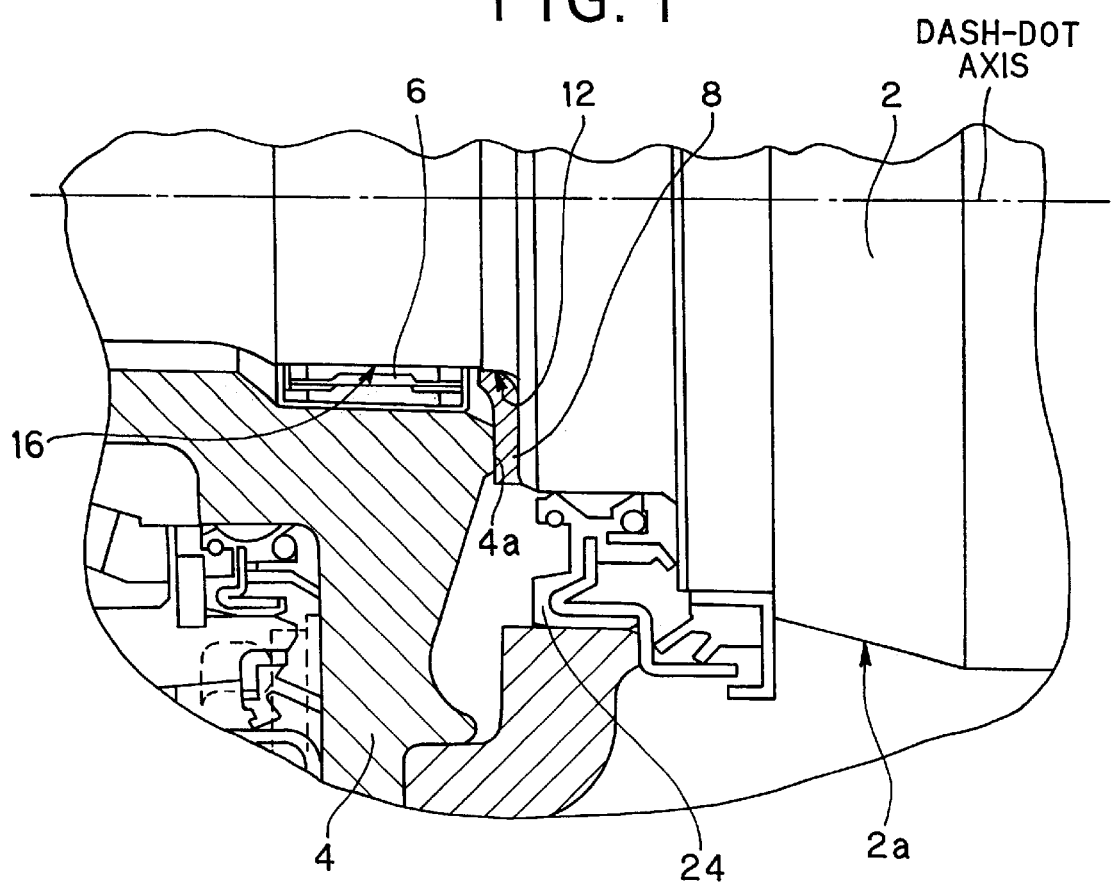
FIG. 1 is a schematic enlarged partial sectional view of a bearing construction portion of an outer joint of a drive shaft showing an embodiment of this invention.

FIGS. 1 to 6 shown an embodiment of this invention. In FIG. 1, reference numeral 2 designates an outer joint or hub of a drive shaft of a vehicle. A spindle sleeve 4 is disposed internally of an axle bearing (not shown) of a vehicle wheel (not shown). The outer joint 2 of the drive shaft is disposed internally of the spindle 4, and drive force from an engine (not shown) is transmitted to the wheel through the outer joint 2 in a conventional manner. A bearing 6 for diametrally rotatably supporting the outer joint 2 is provided between the spindle 4 and the outer joint 2. An annular washer 8 for axially supporting the outer joint 2 is pressed onto the outer joint 2. In detail, the bearing 6 comprises, for example, an antifriction bearing such as a needle bearing, and is disposed in the vicinity of a wheel side end (left-hand in FIG. 1) of the outer joint 2 of the drive shaft.

Figure 3:
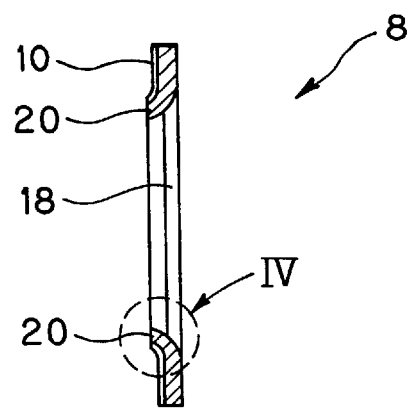
FIG. 3 is a cross sectional view of a washer.
Figure 4:
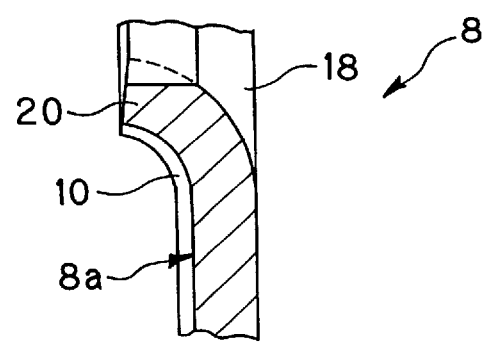
FIG. 4 is an enlarged view of a portion of the washer taken at IV in FIG. 3.

As shown in FIGS. 3 and 4, a sliding member 10 is provided on the bearing side 8a of washer 8 to define a sliding surface, and the inner end of the spindle 4 is provided with an annular surface 4a in contact with the sliding member 10. The sliding member 10 is preferably formed of low friction resin impregnated metal.

Figure 2:
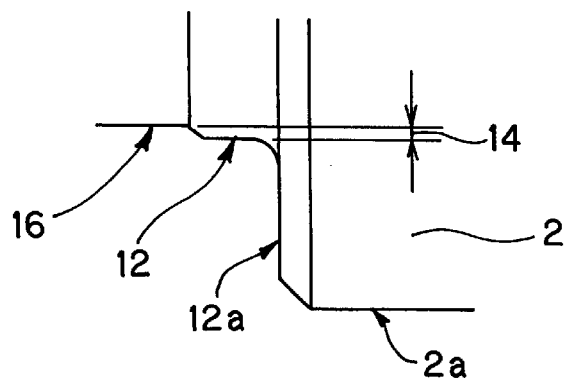
FIG. 2 is a schematic enlarged fragmentary view showing a portion of an outer joint of the drive shaft of FIG. 1.

As shown in FIG. 2, the outer joint 2 includes an annular thrust bearing surface 12a for transferring axial drive force from an engine to an annular surface 4a of the spindle 4 via washer 8.

As shown in FIG. 2, a portion of the outer joint 2 includes an outer peripheral surface 2a, including a washer press-fitting surface 12 and an adjacent bearing rolling surface 16 formed to have a reduced diameter by a distance 14 with respect to the washer press-fitting surface. The press-fitting surface 12 of the washer is defined as a curve shaped gradually changing diameter along the axial direction as shown in the cross section view of FIG. 2. The washer press-fitting surface 12 has a diameter at an inner edge of the thrust bearing surface 12a that is greater than the diameter at or adjacent an edge by the bearing roller surface 16.

When the washer press-fitting surface 12 and the bearing rolling surface 16 are provided on the outer peripheral surface 2a of the outer joint 2 of the drive shaft, the bearing rolling surface 16 and the washer press-fitting surface 12 are axially sequentially formed from the wheel side end (left-hand in FIG. 1) of the outer joint 2 toward the center part between wheels.

Figure 5:
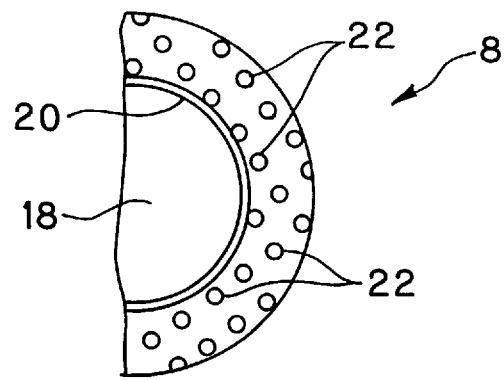
FIG. 5 is a fragmentary front view of the washer.

A press-fitting hole or aperture 18 for press-fitting into the outer joint 2 is formed by boring or the center part of the washer 8, as shown in FIG. 3. In doing so, when the press-fitting hole 18 is formed, an axially deflected flange portion 20 is formed along the outer peripheral part of the press-fitting hole 18, as shown in FIGS. 3 to 5. The resulting hole 18 has a diameter which is slightly smaller than the diameter of surface 12.

Figure 6:
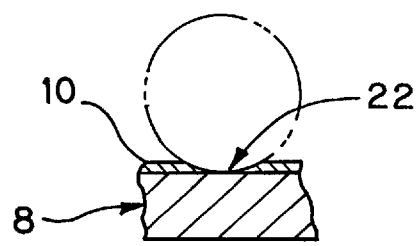
FIG. 6 is an enlarged fragmentary sectional view showing an oil reservoir formed in the washer.

The surface of sliding member 10 on the bearing side 8a of the washer 8 is formed with an oil reservoir 22 as shown in FIG. 5. The oil reservoir 22 is formed spherically (i.e., a partial spherical recess) so as to the bearing side 8a of the washer 8 as shown in FIG. 6 after the sliding member 10 has been provided on the bearing side 8a of the washer 8, and a plurality of such oil reservoirs 22 are formed in a fixed arrangement as shown in FIG. 5, for example.

Reference numeral 24 in FIG. 2 designates a seal member.

The operation of the FIGS. 1–6 embodiment will now be briefly explained.

In assembling work, the washer 8 is press-fitted on the washer press-fitting surface 12 formed on the outer peripheral surface 2a of the outer joint 2 of the drive shaft making use of the press-fitting hole 18 of the washer 8. At this time, the flange portion 20 is press-fitted on surface 12 and projects axially towards the spindle 4.

After press-fitting of the washer 8, the bearing 6 is disposed on the bearing rolling surface 16 formed on the outer peripheral surface 2a of the outer joint 2 of the drive shaft, after which the spindle 4 is disposed around the outer joint.

Thereby, the outer joint 2 can be diametrally supported by the bearing 6 provided between the spindle 4 and the outer joint 2 to minimize or suppress the generation of noise. It is also possible to positively prevent the washer 8 from falling off during assembling work due to the washer 8 being press-fit on the outer joint 2; and there is no possibility that assembling is finished in the state that the washer 8 is not mounted, thus enhancing accuracy and reliance of the assembling work, which is advantageous in practical use.

Further, the provision of the sliding member 10 on the bearing side 8a of the washer 8 provides a sliding surface for sliding engagement with the spindle 4.

Further, the provision of the press-fitting surface 12 and the smaller-diameter bearing rolling surface 16 on the exposed outer peripheral surface 2a of the outer joint 2 eliminates the possibility that, when the washer 8 is press-fitted, the washer 8 scores the bearing rolling surface 16. Thus, the bearing rolling surface 16 can be maintained in a good condition, which is advantageous in practical use. And, determining when the bearing 6 is disposed properly can be easily carried out, thus enhancing the assembly.

Furthermore, the formation of the press-fitting hole 18 in the center part of the washer 8 by boring, enabling the flange portion 20 to be formed around the outer periphery of the hole 18, can easily discriminate both sides of the washer 8 and enables the positive prevention of erroneous mounting of the washer 8.

Further, the formation of a plurality of oil reservoirs 22 on the surface of the sliding member 10 can easily discriminate both sides of the washer 8. That is, the sliding surface provided on the sliding member 10 by the oil reservoirs 22 enables the positive prevention of erroneous mounting of the washer 8, and enables the securing of lubricating oil in the sliding surface within the oil reservoirs 22 to enhance the lubricating performance.

The present invention is not limited to the aforementioned embodiment, and various applied modifications can be made thereto, including those discussed below.

Figure 7:
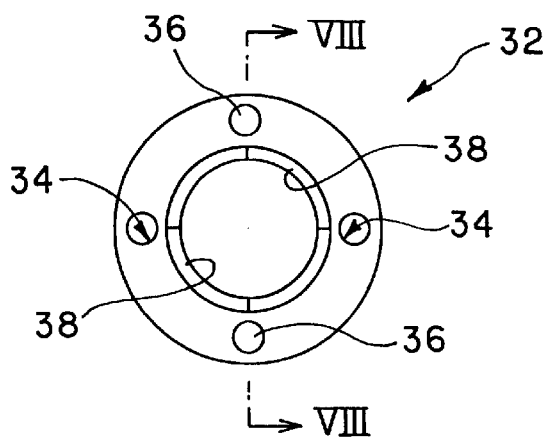
FIG. 7 is a front view of a washer showing a second embodiment of this invention.
Figure 8:
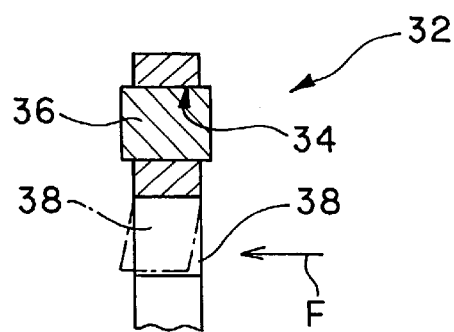
FIG. 8 is a fragmentary enlarged sectional view taken on line VIII—VIII of FIG. 7.

For example, according to a second embodiment, as shown in FIGS. 7 and 8, a plurality of, for example, four mounting holes or apertures 34 are formed in an outer peripheral part of a washer 32 in spaced relation therearound, and sliding members 36 of a bearing material are mounted in the mounting holes 34. In this case, the sliding member 36 is formed to protrude by a fixed amount from both sides of the washer 32.

The center part of the washer 32 is formed with a press-fitting flange or element 38 which is divided into, for example, four sections. The press-fitting element 38 protrudes radially inwardly toward the center by an amount such that it can create an interference fit with surface 12 but will not contact the surface 16.

When the washer 32 is press-fitted on the washer press-fitting surface 12 of the outer joint or hub of the drive shaft, the force exerted on the press-fitting element 38, as shown for example by the arrow F of FIG. 8, deforms the press-fitting element 38 as shown by the dash-dot line of FIG. 8, and the press-fitting assembly is carried out. At that time, the sliding end surface 4a of the spindle is engaged with the sliding members 36 mounted in the mounting holes 34 in the outer peripheral part of the washer 32.

With this arrangement, the washer can be press-fitted on the hub without pre-selecting a particular side of the washer 32.

Figure 9:
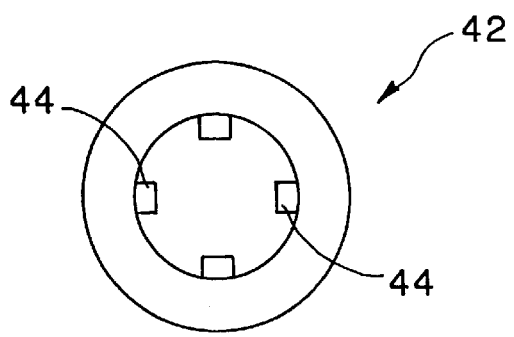
FIG. 9 is a front view of a washer showing a third embodiment of this invention.

Alternatively, the press-fitting element 38 of the washer 32 according to a third arrangement can be constituted as follows. That is, as shown in FIG. 9, an arrangement can be employed in which a plurality, here four, of press-fitting projections 44 directed toward the center of a washer 42 are formed.

In doing so, when the washer 42 is press-fitted on the washer press-fitting surface 12 of the outer joint or hub, the press-fitting projections 44 can be deformed with a small pressing force to perform the press-fitting engagement. Similarly to the aforementioned third arrangement, use can be made by press-fitting without selecting a particular side of the washer 42. Thus, it is possible to positively prevent the washer 42 from falling off and swivelling during the assembling work. Therefore, there is little possibility that the assembling is finished in a state where the washer is not mounted. Thus accuracy and reliance is enhanced during the assembling work.

Figure 10:
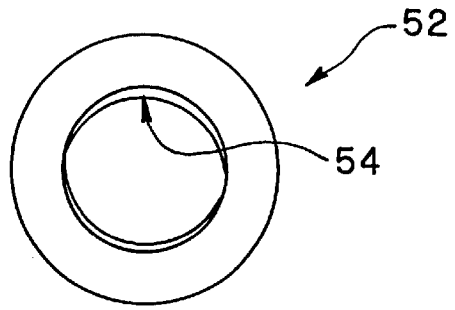
FIG. 10 is a front view of a washer showing a fourth embodiment of this invention.
Figure 11:
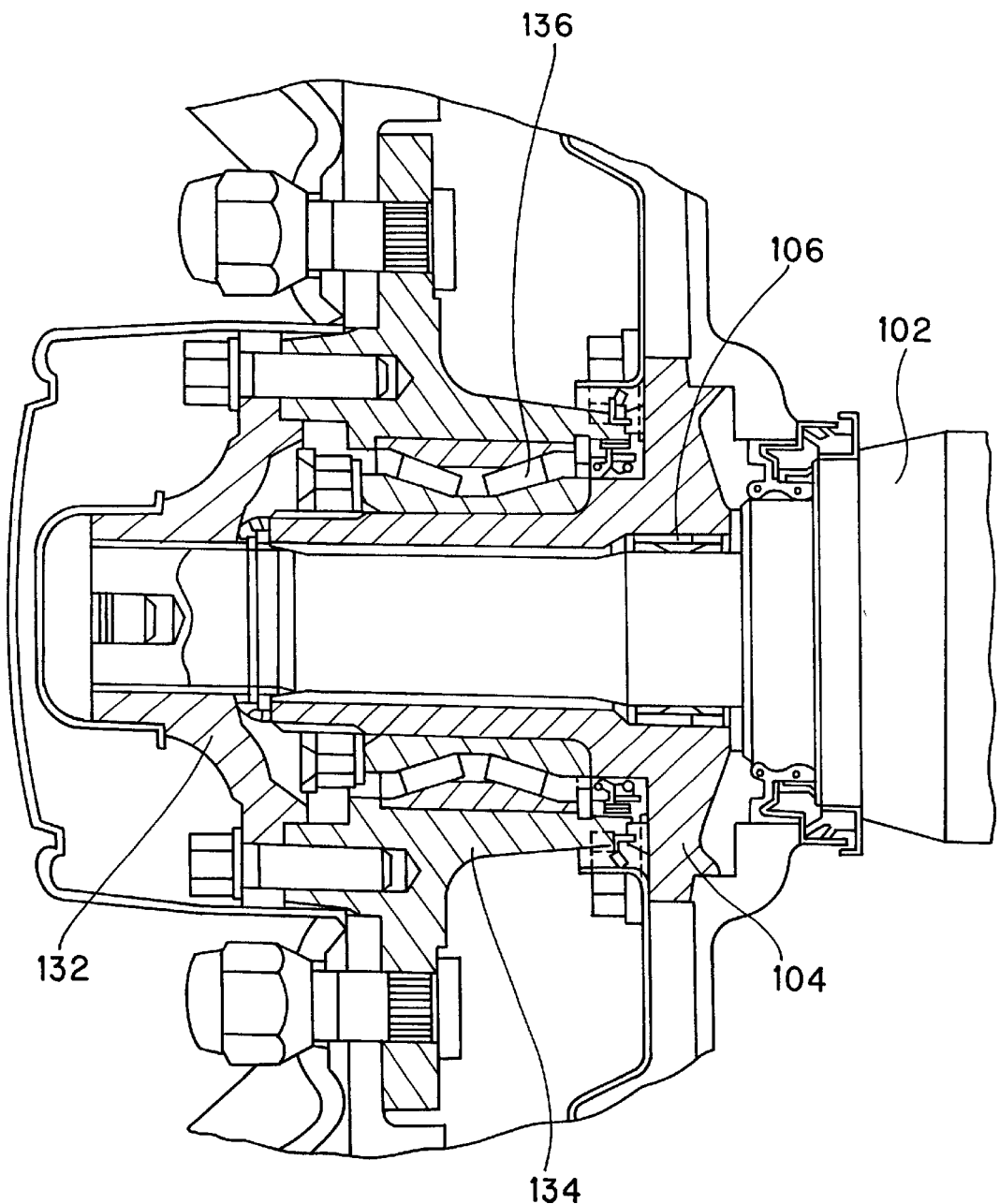
FIG. 11 is a schematic enlarged sectional view of a bearing construction portion of an outer joint of a drive shaft showing a first prior art arrangement.
Figure 12:
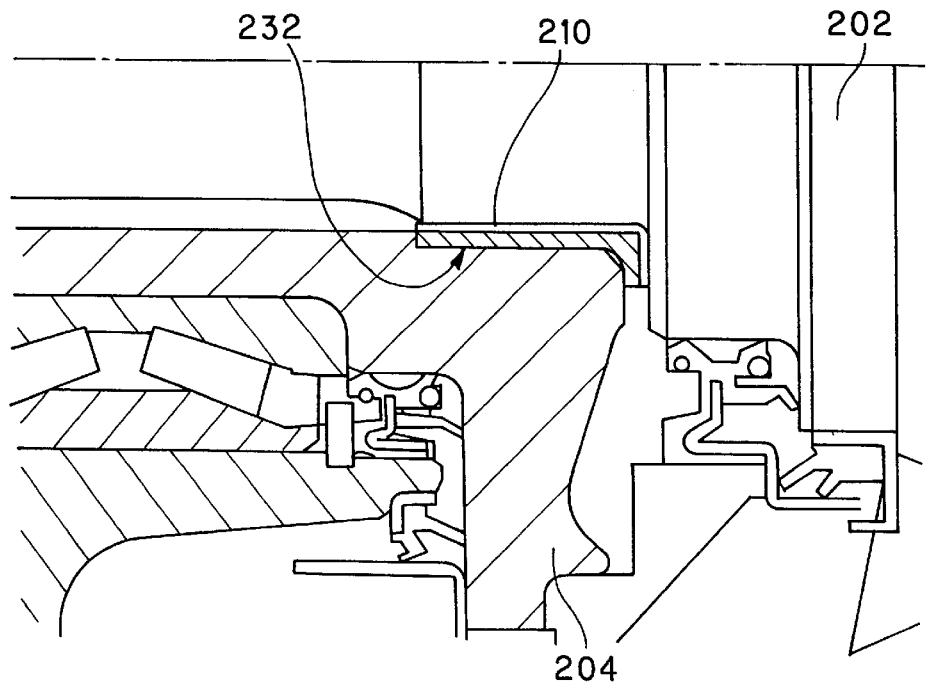
FIG. 12 is a schematic enlarged sectional view of a bearing construction portion of an outer joint of a drive shaft showing a second prior art arrangement.
Figure 13:
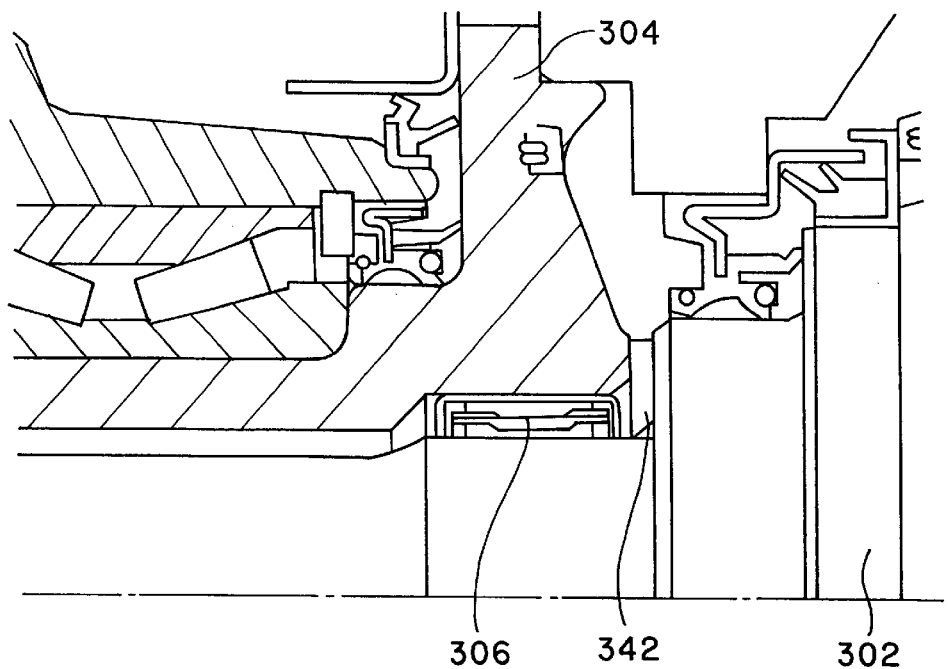
FIG. 13 is a schematic sectional view of a bearing construction portion of an outer joint of a drive shaft showing a third prior art arrangement.

Further, alternatively, an arrangement can be employed in which, as shown in FIG. 10, an oval-shaped press-fitting hole or aperture 54 is formed in the center part of a washer 52, and when press-fitted onto hub surface 12, the press-fitting hole 54 is deformed in a true or substantially true circular shape for gripping the surface 12.

In doing so, when press-fitted, the press-fitting hole 54 of the washer 52 is deformed into a true circle state. Thus, no inconvenience is involved after the press-fitting placement of the washer 52. Further, use can be made by press-fitting without selecting a particular side of the washer 52. It is thus possible to minimize or positively prevent the washer 52 from falling and swivelling during the assembling work. There is little possibility that when the assembling is finished, the washer is not mounted. Thus, enhancement of accuracy and reliance during the assembling work is attained. Moreover, when the press-fitting hole 54 of the washer 52 is formed into an oval shape, it is not necessary to form it into an accurate oval shape, but a hole formed without raising the processing accuracy of the inner peripheral part can be also employed to make the processing workability easy. It is also possible that a fixed portion of an inner peripheral part of a washer formed into a circular shape can be subjected to plastic deforming by means of a hammer or the like to form an approximately oval shape or a shape in which a fixed portion projects to cope with the mounting work on the spot.

As described above in detail, according to the present invention, there is provided a bearing construction for a drive shaft in which a spindle is disposed internally of an axle bearing of a wheel, an outer joint of the drive shaft is disposed internally of the spindle, and a drive force from an engine is transmitted to the wheel through the outer joint, and wherein a bearing for diametrally supporting the outer joint is provided between the spindle and the outer joint, and a washer for axially supporting the outer joint is press-fitted on the outer joint. Therefore, the outer joint can be diametrally supported by the bearing and the generation of noise can be minimized or suppressed and it is possible to positively prevent the washer from falling off during the assembling work. There is little possibility that after the assembling is finished, the washer is not mounted. Therefore, the accuracy and reliance of the assembling work can be enhanced.

Although a particular preferred embodiment of the invention has been disclosed in detail for-illustrative purposes, it will be recognized that variations or modifications of the disclosed apparatus, including the rearrangement of parts, lie within the scope of the present invention.

What is claimed is:

1. A bearing construction for a drive shaft of a vehicle, the bearing construction comprising:
   a hub portion at a wheel side end of the drive shaft having a reduced diameter stepped portion forming a radially outwardly projecting surface and an axially facing thrust bearing surface;
   a spindle disposed internally of an axle bearing of a wheel, said hub portion of the drive shaft being disposed internally of said spindle, drive force from an engine being transmitted to the wheel through said hub portion;
   a bearing supporting said hub portion and positioned between said spindle and said hub portion; and
   a washer press-fitted on said radially outwardly projecting surface of said hub portion to provide axial support between said hub portion and said spindle.

2. The bearing construction according to claim 1, wherein said bearing is disposed in the vicinity of a wheel side end of the hub portion of the drive shaft.

3. The bearing construction according to claims 1, wherein said washer is provided with a sliding member having a siding surface on a bearing side thereof.

4. The bearing construction according to claim 3, wherein said washer is provided with a plurality of oil reservoirs at the sliding surface on the bearing side thereof.

5. The bearing construction according to claim 1, wherein the radially outwardly projecting surface of said hub portion of said drive shaft acts as a press-fitting surface for press-fitting said washer and said hub portion includes an axially adjacent radially projecting bearing rolling surface smaller in diameter than said press-fitting surface.

6. The bearing construction according to claim 1, wherein said washer is formed with a press-fitting hole by boring for press-fitting on said hub portion of said drive shaft.

7. The bearing construction according to claim 1, wherein said washer includes apertures formed in an outer peripheral part of said washer, and sliding bearing members mounted in said apertures.

8. The bearing construction according to claim 7, wherein said washer includes press-fitting elements protruding toward a center of said washer, and respective said sliding members protruding from both ends of respective said apertures.

9. The bearing construction according to claim 1, wherein said washer includes press-fitting projections directed toward a center of said washer.

10. The bearing construction according to claim 1, wherein said washer includes an oval-shaped press-fitting aperture in a center part thereof for press-fitting to said outer joint.

11. A bearing construction for a drive shaft in which a spindle is disposed internally of a wheel, and in which an outer hub portion of the drive shaft is coaxially disposed internally of said spindle, the bearing construction comprising:
   an outer peripheral surface of said hub portion defining an annular washer engaging surface and an adjacent annular bearing surface, said bearing surface having a smaller diameter than said washer engaging surface; and
   an annular washer surrounding and in press-fit engagement with said washer engaging surface.

12. The-bearing construction according to claim 11, wherein the washer is disposed axially inwardly of the bearing surface and is disposed in axial thrust bearing relationship between opposed parts of said spindle and said hub portion.

13. The bearing construction according to claim 12, wherein said annular washer includes a flange portion formed around the inner periphery of a washer hole and varying in diameter along the axial direction, said flange portion received by said washer engaging surface which varies in diameter along the axial direction.

14. The bearing construction according to claim 11, wherein said washer includes a sliding member having a sliding surface on a bearing side thereof.

15. The bearing construction according to claim 14, wherein said washer includes a plurality of lubricant reservoirs at the sliding surface on the bearing side thereof.

16. The bearing construction according to claim 11, wherein said washer includes mounting apertures formed in an outer peripheral part of said washer, and sliding members fixedly mounted in said apertures.

17. The bearing construction according to claim 16, wherein said washer includes press-fitting elements protruding toward a center of said washer, and respective said sliding members protrude from both ends of respective said apertures.

18. The bearing construction according to claim 11, wherein said washer includes press-fitting projections directed toward a center of said washer.

19. The bearing construction according to claim 11, wherein said washer includes an oval-shaped press-fitting aperture in a center part thereof for fitting to said outer joint.

20. The bearing construction according to claim 11, wherein said washer is provided with a press-fitting aperture and a flange portion exposed to and engaged with said washer receiving surface.

* * * * *